US012586931B2

(12) United States Patent
Telesco

(10) Patent No.: US 12,586,931 B2
(45) Date of Patent: Mar. 24, 2026

(54) POWER SUPPLY WITH CABLE RETENTION

(71) Applicant: Havis, Inc., Warminster, PA (US)

(72) Inventor: Stephen P. Telesco, Dexter, MI (US)

(73) Assignee: Havis, Inc., Warminster, PA (US)

( * ) Notice: Subject to any disclaimer, the term of this patent is extended or adjusted under 35 U.S.C. 154(b) by 56 days.

(21) Appl. No.: 18/380,753

(22) Filed: Oct. 17, 2023

(65) Prior Publication Data

US 2025/0121785 A1     Apr. 17, 2025

(51) Int. Cl.
| | |
|---|---|
| *H01R 4/12* | (2006.01) |
| *B60R 16/033* | (2006.01) |
| *H01R 4/10* | (2006.01) |
| *H01R 4/26* | (2006.01) |

(52) U.S. Cl.
CPC ............. *H01R 4/12* (2013.01); *B60R 16/033* (2013.01); *H01R 4/10* (2013.01); *H01R 4/26* (2013.01)

(58) Field of Classification Search
CPC ............... H01R 4/10; H01R 4/12; H01R 4/26
See application file for complete search history.

(56) References Cited

U.S. PATENT DOCUMENTS

| | | | | | |
|---|---|---|---|---|---|
| 6,030,247 | A | * | 2/2000 | Sasahara ................ | H01R 13/20 |
| | | | | | 439/79 |
| 7,151,356 | B1 | * | 12/2006 | Chen ....................... | G06F 1/263 |
| | | | | | 320/114 |
| RE42,926 | E | * | 11/2011 | Norwood ............. | H01R 13/641 |
| | | | | | 439/314 |

| | | | | | |
|---|---|---|---|---|---|
| 9,887,502 | B2 | * | 2/2018 | Yoshioka ............... | H01R 24/58 |
| 11,974,410 | B1 | * | 4/2024 | Lin ....................... | H05K 5/0217 |
| 2004/0150374 | A1 | * | 8/2004 | Kraus ..................... | H02J 9/066 |
| | | | | | 322/4 |
| 2007/0077812 | A1 | | 4/2007 | Liang | |
| 2007/0278996 | A1 | * | 12/2007 | So ........................ | H01R 13/447 |
| | | | | | 320/107 |

(Continued)

OTHER PUBLICATIONS

Switchcarft BKZ Series DC Power Jacks & Plugs brochure, May 28, 2022, available online at https://www.switchcraft.com/bkz-series-dc-power-jacks-and-plugs/ (Year: 2022).*

(Continued)

*Primary Examiner* — Adi Amrany
(74) *Attorney, Agent, or Firm* — Buchanan Ingersoll & Rooney PC

(57)     ABSTRACT

Power supplies and methods of use thereof are disclosed. One power supply includes an electrical power source, a power supply connector, a housing, a cable retainer, and an electrical cable. The power supply connector is in electrical communication with the electrical power source. The housing at least partially contains the electrical power source and supports the power supply connector. The cable retainer is coupled to the housing. The electrical cable has a cable connector configured to be connected to the power supply connector to communicate with the electrical power source. The cable connector is configured to be axially rotatable while connected to the power supply connector between a first position, in which the cable connector can be disconnected from the power supply connector, and a second position, in which the cable connector engages with the cable retainer to prevent disconnection of the cable connector from the power supply connector.

14 Claims, 5 Drawing Sheets

(56) References Cited

U.S. PATENT DOCUMENTS

| 2011/0148206 A1* | 6/2011 | Hernandez | H02J 9/061 |
| | | | 307/66 |
| 2012/0300526 A1* | 11/2012 | Chuang | H02J 13/00001 |
| | | | 363/146 |
| 2013/0065420 A1* | 3/2013 | Van Swearingen | H01R 13/625 |
| | | | 439/372 |
| 2013/0102178 A1* | 4/2013 | Van Swearingen | H01R 13/641 |
| | | | 439/314 |
| 2017/0317446 A1* | 11/2017 | Byrne | H01R 24/005 |

OTHER PUBLICATIONS

Extended European Search Report issued Mar. 18, 2025, by the European Patent Office in corresponding European Patent Application No. 24207284.1-1201. (8 pages).

* cited by examiner

POWER SUPPLY WITH CABLE RETENTION

TECHNICAL FIELD

The present invention relates generally to power supplies, and more particularly, to DC/DC power converters having removable and reconnectable cables.

BACKGROUND

Specialized vehicles are an essential tool in many different professions. For example, professions such as law enforcement commonly utilize a number of specialized electronic apparatuses (e.g., computers, radio systems, sirens) that are not found in conventional automobiles. Other professions and enterprises also commonly have a need to use vehicles with similar specialized equipment. For example, customized electronics apparatuses are frequently installed in vehicles such as forklifts, waste collection trucks, utility trucks, construction equipment and agricultural equipment. While vehicles may be specially manufactured that include these apparatuses, these apparatuses may also be added to conventional automobiles or other vehicles through after-market installations. This is particularly true in the context of law enforcement vehicles, because these vehicles are usually based on conventional road vehicles, and each vehicle can require unique customizations depending upon the particular requirements of the jurisdiction or purpose.

When vehicles are fitted with custom electronics and other equipment, it can become necessary to provide a specialized power supply, such as a DC/DC power converter, that transforms the vehicle's power to a form suitable for use by electronics. An easy and secure connection to such a power supply may be particularly important to ensure steady and reliable use of the installed electronics. In the environment of a moving vehicle, inadvertent disconnection of electronics from a power supply may create a number of problems, particularly where the power supply cannot readily be accessed or the vehicle driver cannot divert attention from driving the vehicle. Thus, there remains a need to provide power supplies featuring improved cable retention.

SUMMARY

Aspects of the present invention are directed to power supplies and methods of use thereof.

An example power supply includes an electrical power source, a power supply connector, a housing, a cable retainer, and an electrical cable. The power supply connector is in electrical communication with the electrical power source. The housing at least partially contains the electrical power source and supports the power supply connector. The cable retainer is coupled to the housing. The electrical cable has a cable connector configured to be connected to the power supply connector to communicate with the electrical power source. The cable connector is configured to be axially rotatable while connected to the power supply connector between a first position, in which the cable connector can be disconnected from the power supply connector, and a second position, in which the cable connector engages with the cable retainer to prevent disconnection of the cable connector from the power supply connector.

An example power connection method includes connecting a cable connector of an electrical cable to a power supply connector in electrical communication with an electrical power source, and axially rotating the cable connector while the cable connector is connected to the power supply connector between a first position, in which the cable connector can be disconnected from the power supply connector, and a second position, in which the cable connector engages with a cable retainer coupled to the power supply connector to prevent disconnection of the cable connector from the power supply connector.

BRIEF DESCRIPTION OF THE DRAWINGS

The invention may be best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be omitted. In addition, according to common practice, the various features of the drawings are not drawn to scale unless otherwise indicated, and the dimensions of the various features may be expanded or reduced for clarity. Included in the drawings are the following figures.

DETAILED DESCRIPTION

The systems and apparatus disclosed herein are usable to supply power to electronic devices, e.g., within conventional vehicles (such as automobiles). While the disclosed power supplies are described herein with respect to use and accessibility within the cabin of a vehicle, it will be understood that the invention is not so limited. To the contrary, aspects of the present invention are usable in any application in which a secure connection to a power supply is desired The disclosed systems and apparatus are particularly suitable for use with DC/DC power converters. Such DC/DC power converters may be configured to transform DC power from an external DC power source, such as a vehicle battery, to a form usable for electronic devices such as laptops, tablets, transmitters, or the like. Electronic devices or objects that may be powered by the disclosed power supplies will be known to those of ordinary skill in the art from the description herein. The disclosed systems and apparatus may be configured to ensure a secure connection with a power cable of the electronic device, to prevent accidental disconnection during use or operation of the vehicle.

Figure 1:
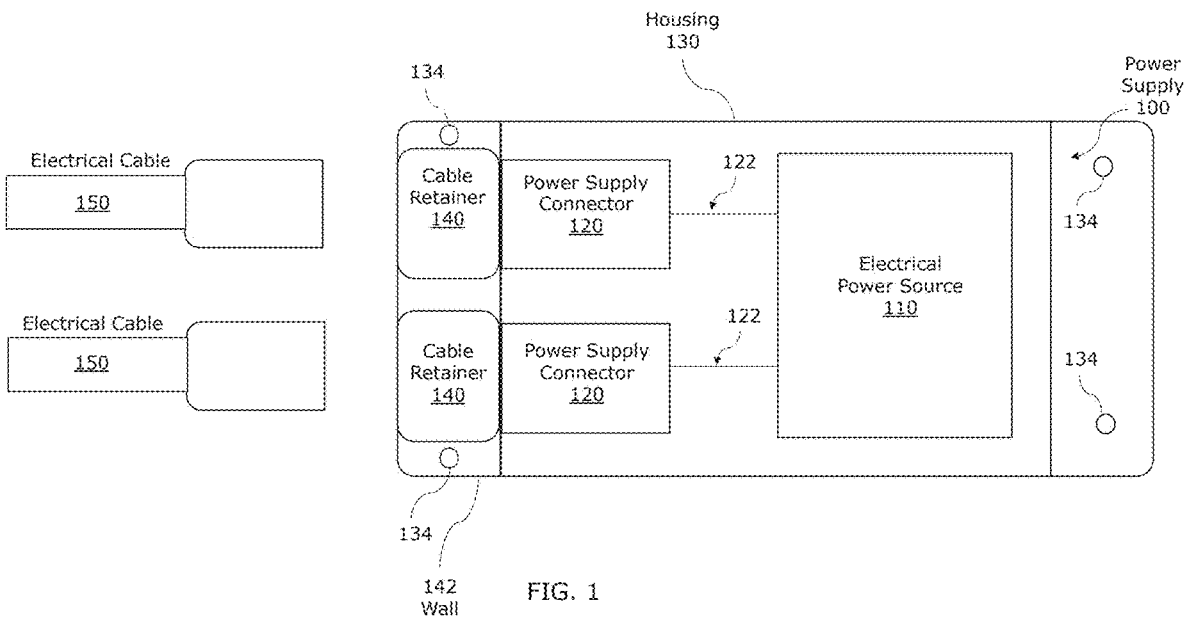
FIG. 1 is a block diagram of an example power supply having cables configured for connection thereto.

With reference to the drawings, FIG. 1 illustrates an example power supply 100. Power supply 100 may be installed, for example, in a moving vehicle for powering electronic devices within the moving vehicle. As an example, power supply 100 includes an electrical power source 110, a power supply connector 120, a housing 130, a cable retainer 140, and an electrical cable 150. Additional details of this example power supply 100 are set forth below.

Electrical power source 110 provides electrical power for powering one or more electronic devices. In one example, electrical power source 110 is a DC/DC power converter. In this example, electrical power source 110 receives power from an external power source (e.g., a vehicle battery), and is configured to convert this power to a different level (e.g., a different voltage). Electrical power source 110 may receive the power from the external power source via electrical cable 150, which may in this example service as a DC power cable configured to communicate power from the external DC power source to the DC/DC power converter. In other examples, electrical power source 110 may produce DC power directly, without the need for an external power source, or may be an AC/DC power converter. Suitable sources of power use as electrical power source 110 may depend on the electronic device(s) to be powered, as would be understood by one of ordinary skill in the art from the description herein.

Power supply connector 120 is in electrical communication with electrical power source 110. Power supply connector 120 provides an electrical connection for transmitting power to or from electrical power source 110. Power supply 100 may further include an electrical connection 122 between power supply connector 120 and electrical power source 110 for enabling transmission of electrical power. Except as otherwise specified herein, the form of power supply connector 120 is not particularly limited. Suitable connector types for use as power supply connector 120 include, for example, barrel or tip connectors, such as those complying with the EIA-364 Standard, and/or those used in power supplies having International Electrotechnical Commission (IEC) certification. Other suitable connectors will be understood by one of ordinary skill in the art from the description herein.

Figure 2:
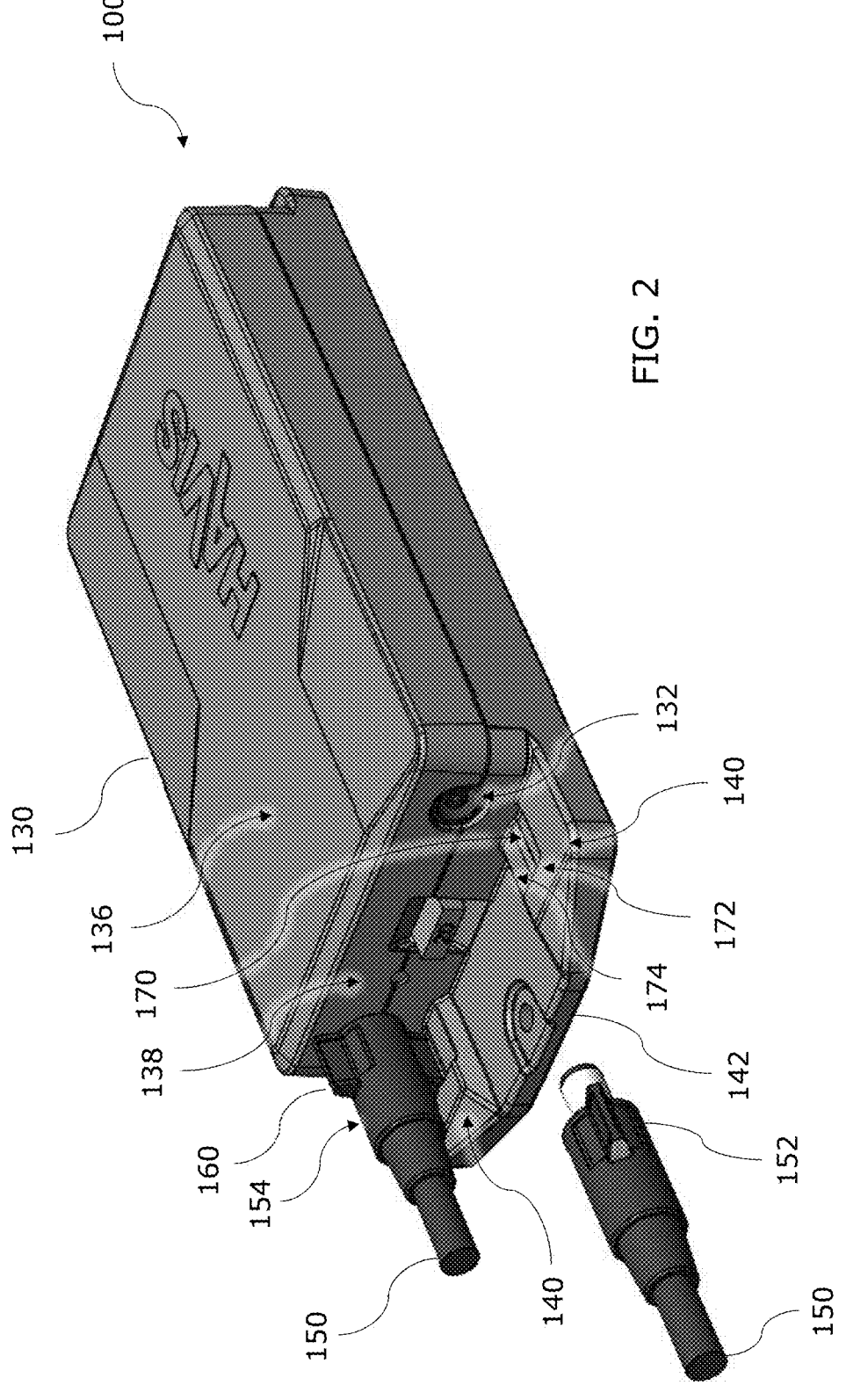
FIG. 2 is a perspective view of the power supply of FIG. 1.

Housing 130 at least partially contains electrical power source 110 and supports power supply connector 120. As shown in FIGS. 1 and 2, electrical power source 110 is entirely enclosed within and/or encapsulated by housing 130. Additionally, power supply connector 120 may be recessed within housing 130, and accessible via an opening 132 in housing 130. In one example, housing 130 may be formed from a molding material that is at least partially overmolded around electrical power source 110 and/or power supply connector 120.

Housing 130 may be adapted for installation or securing within a vehicle. In one example, housing 130 includes one or more attachment points 134 for fixing the location of housing 130 within a vehicle. The shape and size of housing 130 may be selected based on the intended installation location of power supply 100, as well as the size and type of electrical power source 110. In one example, housing 130 may have a rectangular prism shape, as shown in FIG. 2. In this example, housing 130 has broad upper and lower surfaces 136, and narrow side surface 138. Power supply connector 120 is accessible via opening 132 in the side surface 138 of housing 130. Housing 130 may further include design or stylization elements to enhance appearance or visibility within the vehicle.

A cable retainer 140 is coupled to housing 130. Cable retainer 140 is configured to retain and/or maintain an electrical connection to power supply connector 120, as explained in greater detail below. In one example, cable retainer 140 is formed as part of housing 130. Cable retainer 140 may be integrally formed with housing 130, e.g. as a unitary part. In a further example, as set forth above, housing 130 may be formed from a molding material that is also at least partially overmolded around electrical power source 110 and/or power supply connector 120. In this example, cable retainer 140 may be integrally formed with housing 130 from the molding material. i.e. by being integrally molded as part of housing 130. Further details regarding the structure and function of cable retainer 140 may depend on the structure of electrical cable 150, and as such are described in greater detail below.

Electrical cable 150 provides an electrical conduit for receiving power from or transmitting power to electrical power source 110. To this end, electrical cable 150 includes a cable connector 152 configured to be connected to power supply connector 120, in order to electrically communicate with electrical power source 110. Electrical cable 150 may be an electrical input cable between power source 110 and an external power source, or an electrical output cable between power source 110 and an electronic device. In this latter example, electrical cable 150 may form part of a circuit connecting electrical power source 110 to an electronic device to be powered, e.g. via electrical connection 122, power supply connector 120, cable connector 152, and electrical cable 150.

As shown in FIGS. 1 and 2, power supply 100 may include both an electrical input cable and an electrical output cable, either or both of which may include the features of electrical cable 150 described herein. Where multiple cables are included, the respective cables and power supply connectors may be provided with visual indications to promote proper connection and avoid mis-assembly of power supply 100. For example, cable connectors and/or power supply connectors may be shaped and/or color coded to align the input cable with an input connector and an output cable with an output connector.

The form of cable connector 152 is selected to correspond to power supply connector 120. In an example, cable connector 152 and power supply connector 120 have a structure such that connection therebetween can be achieved by inserting cable connector 152 into opening 132 in housing 130. Cable connector 152 does not have a structure that requires rotation of cable connector 152 relative to power supply connector 120 to create the electrical connection. In other words, cable connector 152 is not rotated to create an electrical connection between electrical cable 150 and electrical power source 110. The rotating of cable connector 152 therefore would only perform a cable retention function, as set forth below.

In one example, cable connector 152 is configured to be axially rotatable while connected to power supply connector 120, e.g. after an electrical connection between cable connector 152 and power supply connector 120 has already been made. In this example, cable connector 152 can be rotated between a first angular position P1, shown in FIG. 4A, and a second position P2, shown in FIG. 4B. The first position P1 may represent an initial position or insertion position of cable connector 152 into power supply connector 120. In this first position P1, cable connector 152 can be disconnected from power supply connector 120, e.g. by pulling cable connector 152 outward from power supply connector 120. The second position P2 may represent a final or engaged position of cable connector 152 relative to power supply connector 120. In this second position P2, cable connector 152 engages with cable retainer 140 to prevent disconnection of cable connector 152 from power supply connector 120. This engagement between cable connector 152 and cable retainer 140 is described in further detail below.

In one example, cable connector 152 can be rotated from the first position P1 to the second position P2 using a rotation of 180° or less relative to power supply connector 120. In this example, cable connector 152 can be retained in connection with power supply connector 120 through a rotation of just 180° following insertion of cable connector 152. In a further example, cable connector 152 can be rotated from the first position P1 to the second position P2 using a rotation of 90° or less relative to power supply connector 120. In this example, cable connector 152 can be retained in connection with power supply connector 120 through a rotation of just 90° following insertion of cable connector 152. Limiting the amount of rotation necessary between insertion and retention of cable connector 152 may be desirable in order to simplify the connection and retention of electrical cable 150 to electrical power source 110.

To enable axial rotation of cable connector 152 relative to power supply connector 120, both connectors may be axially symmetric, i.e., symmetrical around respective center axes thereof. By sharing axial symmetry, power supply connector 120 may avoid any physical structures that would interfere with rotation of cable connector 152 between the first position P1 and the second position P2. Additionally or alternatively, cable connector 152 and/or power supply connector 152 may include structures that limit or block rotation in directions other than the requisite direction between the first position P1 and the second position P2, to promote proper rotation and cable retention.

Figures 3, 4A, 4B:
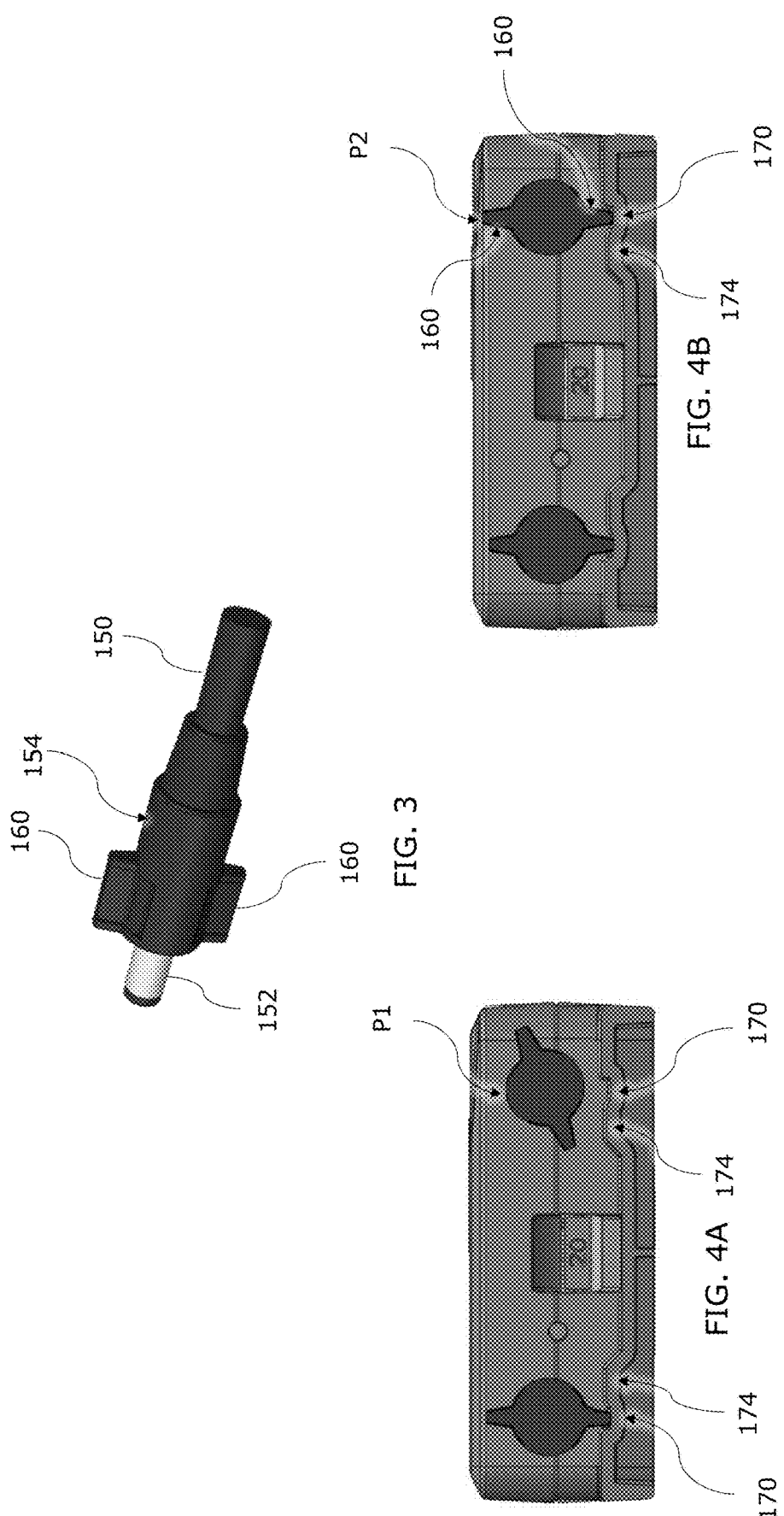
FIG. 3 is a perspective view of an example cable connector.
FIGS. 4A-4D are cross-sectional rear and side views of the cable connector of FIG. 3 engaging with example cable retainers.

A particular example of cable connector 152 and cable retainer 140 will now be described with respect to FIGS. 2 and 3. In this example, cable connector 152 has a radial projection 160 extending from a circumferential outer surface 154 associated therewith. Just as cable retainer may be integrally formed with housing 130, radial projection 160 may be integrally formed with a housing of cable connector 152. For example, cable connector 152 may include an overmolding material forming a housing or plug surrounding the circumferential outer surface 154 thereof. In this example, radial projection 160 may be integrally formed from the molding material overmolding cable connector 152.

Corresponding to this radial projection 160, cable retainer 140 comprises a pocket 170 configured to receive and retain radial projection 160 when cable connector 152 is rotated to be in the second position P2. As shown in FIG. 2, cable retainer 140 may include a wall 142 facing at least a portion of the circumferential outer surface 154 of cable connector 152. In this example, pocket 170 may be formed on or extending from the wall 142. Alternatively or additionally, pocket 170 may be defined at least in part by a structure on or recess in wall 142.

Figure 4D:
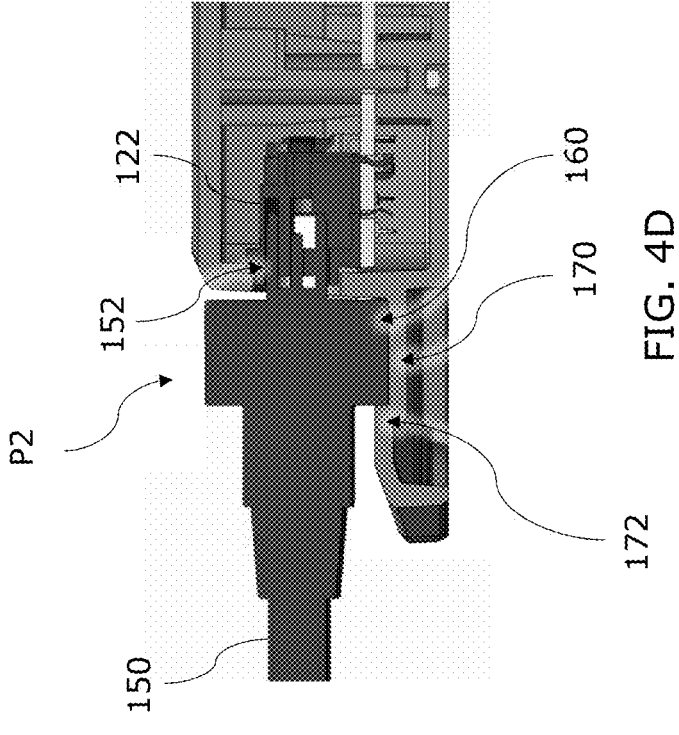

In one example, pocket 170 may be defined by or include an axial barrier 172 formed at an axial end of pocket 170 opposite power supply connector 120. As shown in FIG. 4D, axial barrier 172 blocks axial movement of cable connector 152 away from the power supply connector when cable connector 152 is in the second position P2. Axial barrier 172 may be configured to contact or abut against an axially rear surface of projection 160 when projection 160 is received within pocket 170, thereby blocking withdrawal of cable connector 152 from power supply connector 120.

Figure 4C:
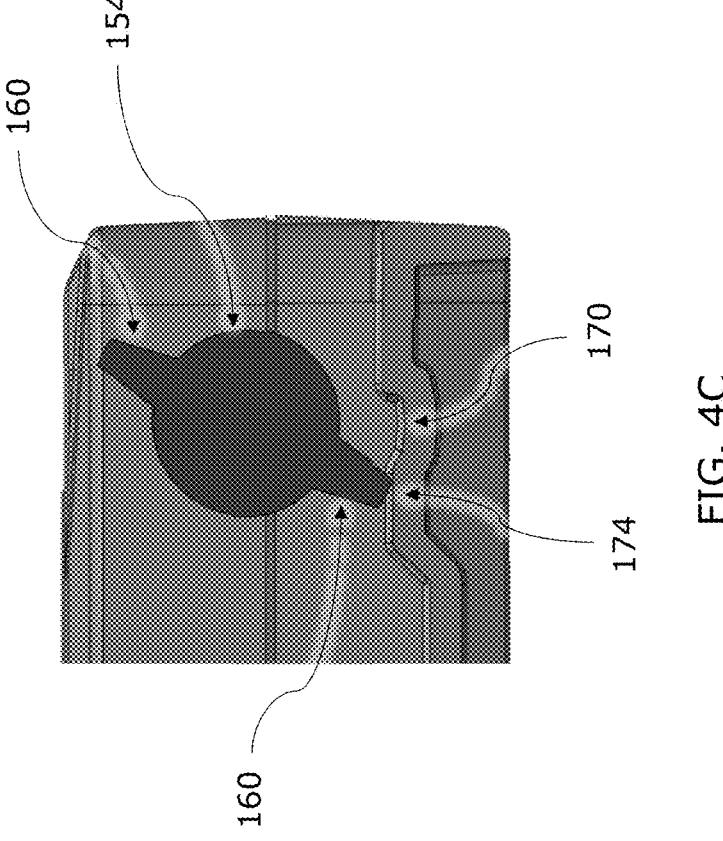

In one example, pocket 170 may include a circumferential detent 174 positioned along a path of radial projection 160 between the first position P1 and the second position P2 of cable connector 152. As shown in FIG. 4C, detent 174 may be positioned to contact radial projection 160 during rotation of cable connector 152 from the first position P1 to the second position P2, without completely preventing such rotation. In this manner, detent 174 resists rotation of cable connector 152 from the second position P2 toward the first position P1 (and/or vice versa). Thus, once cable connector 152 is rotated past detent 174 to engage with cable retainer 140, detent 174 can resist or prevent cable connector 152 from reverse rotation that would inadvertently cause cable connector 152 to reach the first position P1 and potentially disengage from cable retainer 140.

Axial barrier 172 and detent 174 cooperate to prevent accidental disconnection of cable connector 152 from power supply connector 120. This may desirably avoid disruptions in power to electronic devices due to accidental contact, vibration, or other external factors arising due to operation or occupation of the vehicle.

In a further example, cable connector 152 may include a pair of opposed radial projections 160. As shown in FIG. 3, this example may include a pair of axially-extending wings on either side of cable connector 152. In a corresponding example, pocket 170 may include a pair of circumferential detents 174 positioned on either side of the second position P2. In such an example, cable connector 152 may be rotated in either direction following insertion to move one of the radial projections 160 from position P1 to position P2 within pocket 170. Thus, the use of opposed projections 160 and detents 174 may desirably enable rotation of cable connection 152 in either direction to obtain the cable retention afforded by cable retainer 140.

Figure 5:
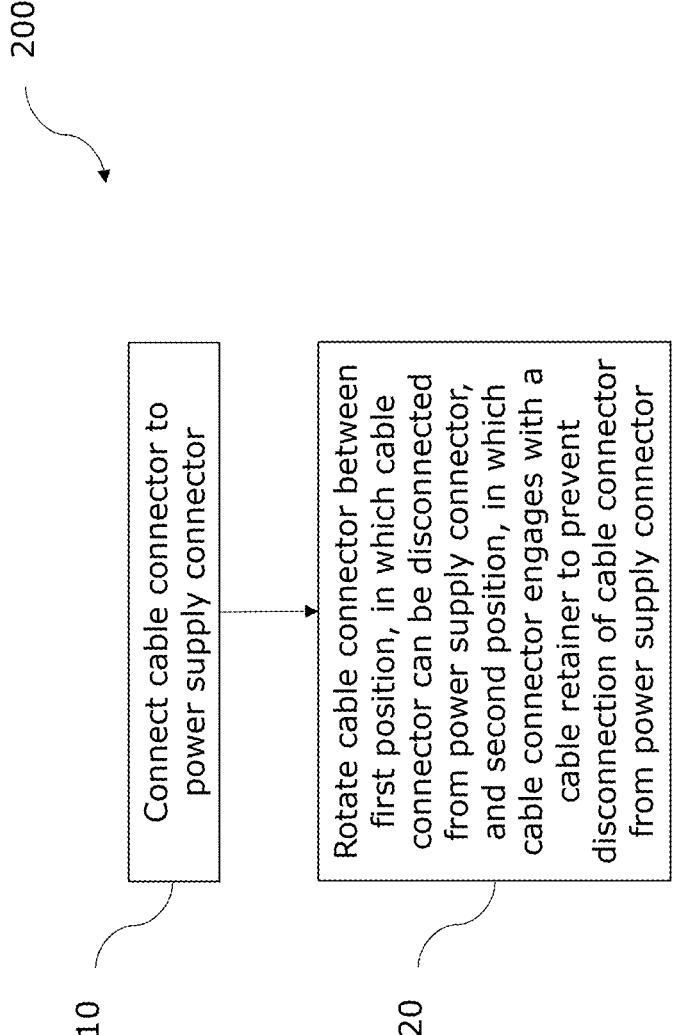
FIG. 5 is a block diagram of an example power connection method.

As noted above, where multiple cables are included, the respective cables and power supply connectors may be provided with visual indications to promote proper connection and avoid mis-assembly of power supply 100. In addition to or instead of differing vehicle indications, the multiple cables may include different cable retention features to promote proper connection. For example, an input cable may include a first projection or structure sized to uniquely engage with a first cable retainer, and an output cable may include a second projection or structure sized to uniquely engage with a second, different cable retainer. Since each cable connector would only engage with its assigned cable retainer, incorrect connection or assembly of power supply 100 may be avoided With further reference to the drawings, FIG. 5 illustrates an example power connection method 200. Power connection method 200 may be performed using power supply 100. As an example, power connection method 200 includes connecting a cable connector 210 and axially rotating the cable connector 220. Additional details of this example power connection method 200 are set forth below.

In step 210, a cable connector of an electrical cable is connected to a power supply connector in electrical communication with an electrical power source. For example, cable connector 152 of electrical cable 150 is connected to power supply connector 120, which is in electrical communication with electrical power source 110.

In an example, cable connector 152 of electrical cable 150 is connected to power supply connector 120 by inserting cable connector 152 into an opening 132 in housing 130 providing access to power supply connector 120. This connecting does not include rotating cable connector 152 relative to power supply connector 120. In other words, cable connector 152 is not rotated to create an electrical connection between electrical cable 150 and electrical power source 110. The rotating of cable connector 152 therefore only performs a cable retention function, rather than additionally performing a connection function.

In step 220, the cable connector is axially rotated while connected to a power supply connector. For example, cable connector 152 is axially rotated while connected to power supply connector 120 between first position P1, in which cable connector 152 can be disconnected from power supply connector 120, to second position P2, in which cable connector 152 engages with cable retainer 140, which is coupled to power supply connector 120, to prevent disconnection of cable connector 152 from power supply connector 120.

In a further example, cable connector 152 is axially rotated until a radial projection 160 on cable connector 152 is received and retained with pocket 170 coupled to housing 130 and power supply connector 120. This rotating may require a rotation of 180° or less of the cable connector 152 relative to power supply connector 120. Further, this rotating may require a rotation of 90° or less of the cable connector 152 relative to power supply connector 120.

Although the invention is illustrated and described herein with reference to specific embodiments, the invention is not intended to be limited to the details shown. Rather, various modifications may be made in the details within the scope and range of equivalents of the claims and without departing from the invention.

The invention claimed is:

1. A power supply comprising:
an electrical power source;
a power supply connector in electrical communication with the electrical power source;
a housing at least partially containing the electrical power source and supporting the power supply connector, the housing comprising an outer surface having an opening, the power supply connector recessed within the opening;
a cable retainer coupled to the housing; and
an electrical cable having a cable connector configured to be connected to the power supply connector to communicate with the electrical power source,
wherein the power supply connector and the cable connector are axially symmetrical, and
wherein the cable connector is configured to be axially rotatable while connected to the power supply connector between a first position, in which the cable connector can be disconnected from the power supply connector, and a second position, in which the cable connector engages with the cable retainer to prevent disconnection of the cable connector from the power supply connector,
wherein the cable connector comprises a radial projection integrally formed from a molding material overmolding the cable connector, and
wherein the cable retainer comprises a wall extending away from the opening and outwardly from the outer surface of the housing and a pocket formed in the wall, the pocket configured to face the molding material of the cable connector when the cable connector is connected to the power supply connector, the pocket configured to receive and retain the radial projection outside of the opening in the housing when the cable connector is rotated to be in the second position.

2. The power supply of claim 1, wherein the cable retainer is integrally formed with the housing.

3. The power supply of claim 2, wherein the housing comprises a molding material at least partially overmolding the electrical power source and the power supply connector, and the cable retainer is integrally formed with the housing from the molding material.

4. The power supply of claim 1, wherein the pocket comprises an axial barrier at an axial end of the pocket opposite the power supply connector, the axial barrier blocking movement of the cable connector away from the power supply connector when the cable connector is in the second position.

5. The power supply of claim 1, wherein the pocket comprises a circumferential detent between the first and second positions of the cable connector, the detent physically resisting (i) rotation of the cable connector from the second position toward the first position and (i) rotation of the cable connection from the first position toward the second position.

6. The power supply of claim 5, wherein the radial projection comprises a pair of opposed axially-extending wings, and the circumferential detent comprises a pair of circumferential detents positioned on either side of the second position of the cable connector.

7. The power supply of claim 1, wherein the cable connector can be rotated from the first position to the second position using a rotation of 180° or less.

8. The power supply of claim 7, wherein the cable connector can be rotated from the first position to the second position using a rotation of 90° or less.

9. The power supply of claim 1, wherein the electrical power source comprises a DC/DC power converter.

10. The power supply of claim 9, wherein the electrical cable comprises a DC power cable configured to communicate power from an external DC power source to the DC/DC power converter.

11. A power connection method for a power supply having an electrical power source, a power supply connector in electrical communication with the electrical power source, and a housing at least partially containing the electrical power source and supporting the power supply connector, the housing comprising an outer surface having an opening and a cable retainer coupled to the outer surface, the power supply connector recessed within the opening, the cable retainer comprising a wall extending away from the opening and outwardly from the outer surface of the housing and a pocket formed in the wall, the method comprising:
connecting a cable connector of an electrical cable to the power supply connector, the cable connector comprising a radial projection integrally formed from a molding material overmolding the cable connector, the power supply connector and the cable connector being axially symmetrical; and
axially rotating the cable connector while the cable connector is connected to the power supply connector between a first position, in which the cable connector can be disconnected from the power supply connector, and a second position, in which the cable connector engages with a cable retainer coupled to the power supply connector to prevent disconnection of the cable connector from the power supply connector,
wherein the pocket is configured to face the molding material of the cable connector when the cable connector is connected to the power supply connector, and
wherein the axially rotating includes rotating the cable connector until the radial projection of the cable connector is received and retained within the pocket of the cable retainer outside of the opening in the housing.

12. The power connection method of claim 11, wherein the connecting does not include rotating the cable connector relative to the power supply connector.

13. The power connection method of claim 11, wherein the axially rotating includes rotating the cable connector using a rotation of 180° or less.

14. The power connection method of claim 13, wherein the axially rotating includes rotating the cable connector using a rotation of 90° or less.

\* \* \* \* \*